(12) United States Patent
Zhao et al.

(10) Patent No.: US 11,868,432 B1
(45) Date of Patent: Jan. 9, 2024

(54) METHOD FOR EXTRACTING KANSEI ADJECTIVE OF PRODUCT BASED ON PRINCIPAL COMPONENT ANALYSIS AND EXPLANATION (PCA-E)

(71) Applicant: SICHUAN UNIVERSITY, Chengdu (CN)

(72) Inventors: Wu Zhao, Chengdu (CN); Xin Guo, Chengdu (CN); Miao Yu, Chengdu (CN); Kai Zhang, Chengdu (CN); Wei Jiang, Chengdu (CN); Chong Jiang, Chengdu (CN); Bing Lai, Chengdu (CN); Yiwei Jiang, Chengdu (CN); Jun Li, Chengdu (CN); Bo Wu, Chengdu (CN); Xingyu Chen, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/204,973

(22) Filed: Jun. 2, 2023

Related U.S. Application Data

(63) Continuation of application No. PCT/CN2022/125338, filed on Oct. 14, 2022.

(30) Foreign Application Priority Data

Jun. 16, 2022 (CN) .......................... 202210684413.0

(51) Int. Cl.
- *G06F 40/00* (2020.01)
- *G06F 18/2135* (2023.01)
- *G06F 17/16* (2006.01)

(52) U.S. Cl.
CPC .......... *G06F 18/2135* (2023.01); *G06F 17/16* (2013.01)

(58) Field of Classification Search
CPC .......... G06F 18/2135; G06F 18/21355; G06F 18/2134; G06F 18/2132; G06F 18/2113;
(Continued)

(56) References Cited

U.S. PATENT DOCUMENTS

| | | | | |
|---|---|---|---|---|
| 5,450,314 A | * | 9/1995 | Kagami | G06F 16/58 706/46 |
| 5,974,422 A | * | 10/1999 | Kagami | G06Q 30/02 |

(Continued)

FOREIGN PATENT DOCUMENTS

| | | |
|---|---|---|
| CN | 102012985 A | 4/2011 |
| CN | 106202481 A | 12/2016 |

(Continued)

OTHER PUBLICATIONS

K. Wang, "Research of the Affective Responses to Product's Texture Based on the Kansei Evaluation," 2009 Second International Symposium on Computational Intelligence and Design, Changsha, China, 2009, pp. 352-355, doi: 10.1109/ISCID.2009.234. (Year: 2009).*

(Continued)

*Primary Examiner* — Edgar X Guerra-Erazo
(74) *Attorney, Agent, or Firm* — Bayramoglu Law Offices LLC

(57) ABSTRACT

A method for extracting a kansei adjective of a product based on principal component analysis and explanation (PCA-E) includes constructing a product kansei evaluation vector matrix through original kansei adjectives; performing dimensionality reduction through PCA; and determining, based on principal component load factors, kansei adjectives representing principal components. In this way, the kansei adjectives extracted are explanatory to help users understand the selected kansei adjectives and make accurate evaluation.

17 Claims, 1 Drawing Sheet

(58) Field of Classification Search
CPC .... G06F 18/241; G06F 18/24; G06F 18/2413; G06F 18/243; G06F 40/205; G06F 40/211; G06F 40/216; G06F 40/221; G06F 40/226; G06F 40/242; G06F 40/237; G06F 40/247; G06F 40/253; G06F 40/268; G06F 40/284; G06F 40/289; G06F 40/295; G06F 40/35; G06F 40/42; G06F 40/45
See application file for complete search history.

(56) References Cited

U.S. PATENT DOCUMENTS

| | | | | |
|---|---|---|---|---|
| 6,578,023 | B1 * | 6/2003 | Kagami | ............ G06T 11/00 |
| | | | | 706/54 |
| 6,665,686 | B1 * | 12/2003 | Kagami | ............ G06F 16/583 |
| 2020/0160851 | A1 | 5/2020 | Chiu et al. | |
| 2021/0279419 | A1 * | 9/2021 | Liu | ............ G06F 40/253 |

FOREIGN PATENT DOCUMENTS

| | | | | | |
|---|---|---|---|---|---|
| CN | 107633513 | A | | 1/2018 | |
| CN | 109164471 | A | | 1/2019 | |
| CN | 107330127 | B | * | 6/2020 | ............ G06F 16/93 |
| CN | 111414753 | A | | 7/2020 | |
| CN | 111985209 | A | | 11/2020 | |
| CN | 113902951 | A | | 1/2022 | |
| CN | 114611604 | A | | 6/2022 | |
| CN | 115062702 | A | | 9/2022 | |
| WO | WO-0048095 | A1 | * | 8/2000 | ............ G06F 16/24 |
| WO | WO-2022054631 | A1 | * | 3/2022 | ............ G06Q 30/06 |

OTHER PUBLICATIONS

S. Ali, G. Wang and S. Riaz, "Aspect Based Sentiment Analysis of Ridesharing Platform Reviews for Kansei Engineering," in IEEE Access, vol. 8, pp. 173186-173196, 2020, doi: 10.1109/ACCESS.2020.3025823. (Year: 2020).*
T. Sakamoto and T. Kato, "Kansei-Word Recall Model: Recall Frequency and Memory Retrieval Pathways," 2019 IEEE International Conference on Systems, Man and Cybernetics (SMC), Bari, Italy, 2019, pp. 1121-1124, doi: 10.1109/SMC.2019.8914269. (Year: 2019).*
F. Trapsilawati, T. Wijayanto and M. Ushada, "A Preliminary Study of EEG-based Kansei Engineering: An Illustration on a Squishy Case Study," 2019 5th International Conference on Science and Technology (ICST), Yogyakarta, Indonesia, 2019, pp. 1-6, doi: 10.1109/ICST47872.2019.9166436. (Year: 2019).*
W. Xing-yuan and Y. Xu, "Study on Consumer's Kansei Image Evaluation for High-tech Consumable Products," 2006 International Conference on Management Science and Engineering, Lille, France, 2006, pp. 976-980, doi: 10.1109/ICMSE.2006.314011. (Year: 2006).*
Liao Qinglin, Design Method of Product Identity for Voice Interaction Product Based on Kansei Engineering, 2021, pp. 1-87.
Sotiris Papantonopoulos, et al., A Kansei Engineering Evaluation of the Emotional Appeal of Product Information on E-Commerce Product Pages, CHI Greece 2021: 1st International Conference of the ACM Greek SIGCHI Chapter (CHI Greece 2021), 2021, 8 pages.

* cited by examiner

METHOD FOR EXTRACTING KANSEI ADJECTIVE OF PRODUCT BASED ON PRINCIPAL COMPONENT ANALYSIS AND EXPLANATION (PCA-E)

CROSS REFERENCES TO THE RELATED APPLICATIONS

This application is a continuation of PCT/CN2022/125338 filed on Oct. 14, 2022, which is based on and claims foreign priority to Chinese Patent Application No. 202210684413.0 filed on Jun. 16, 2022, the entire content of which are incorporated herein by reference.

TECHNICAL FIELD

The present disclosure belongs to the technical field of product design and relates to information extraction in product design, in particular to a method for extracting a kansei adjective of a product based on principal component analysis and explanation (PCA-E).

BACKGROUND

At present, it is widely believed that one of the main concerns of product design is to meet the emotional needs of users, rather than the specific practicality of the product. Therefore, kansei design has received widespread attention in the industry and academia. User-oriented design is increasingly recognized by users, and users prefer product design that meets their psychological needs. Research shows that pleasant products are used more frequently, and future purchase choices will be affected by the degree of pleasure in product use. The user's perception of the product largely depends on the design features of the product (including form, color, material, etc.), and the product that meets the user's emotional needs is crucial to the company's success. Therefore, it is necessary to study consumers' subjective perceptions of product design.

Founded in 1970 by Hiroshima University's Mitsuo Nagamachi, kansei engineering is a powerful consumer-oriented method to transform consumers' emotions into design features of the product. Kansei engineering proposes to develop products from a user-oriented perspective and has been applied in many fields, such as mobile phone design, car interior design, interface design, home design, residential design, machine design, medical product design, clothing design, and cultural design.

In the research based on kansei engineering, the first and most important point is to consider the kansei attributes of the product and obtain the user's kansei evaluation of the product. Due to traditional and practical reasons, users' perception of product design features is usually extracted through kansei adjectives. There is no doubt that effective identification of kansei adjectives from a large number of adjectives and collection of users' psychological feelings about design features is important to the research based on kansei engineering. In the previous research based on kansei engineering, factor analysis and cluster analysis were commonly used to identify effective kansei adjectives based on a large number of questionnaire data. This process requires the active participation of users, which is costly, time-consuming, knowledge-intensive, and labor-intensive. Moreover, the kansei adjectives obtained only through subjective questionnaires will more or less lead to uncertainty in evaluation, thus misleading the research direction of kansei engineering. This is because there is a correlation between the kansei adjectives. If each kansei adjective is analyzed separately, the result is often isolated. Thus, blind reduction of indicators will result in the loss of a lot of useful information, thus yielding wrong conclusions.

Therefore, a reasonable method is needed to minimize the loss of information while reducing the kansei adjectives and using fewer kansei adjectives to represent the information of various variables to achieve the purpose of dimensionality reduction. Principal component analysis (PCA) is a dimensionality reduction algorithm. It preserves some of the most important features of high-dimensional data and removes noise and unimportant features, thus achieving the purpose of improving data processing speed. However, each original variable has a certain weight in the principal component, and the distribution of weights (loads) lacks a clear boundary. This makes it impossible to clearly express the original variable represented by the principal component, that is, to clearly explain the meaning of the extracted principal component. In view of this, the present disclosure proposes a method for extracting a kansei adjective of a product based on principal component analysis and explanation (PCA-E) dimensionality reduction algorithm to help designers better screen the kansei adjective.

SUMMARY

In order to solve the problem of the prior art that product design and evaluation are affected due to information loss caused by the reduction of kansei adjectives, an objective of the present disclosure is to provide a method for extracting a kansei adjective of a product based on principal component analysis and explanation (PCA-E) to help designers better screen the kansei adjective.

To achieve the foregoing objective, the present disclosure adopts the following technical solution:

The method for extracting a kansei adjective of a product based on PCA-E includes:
S1: constructing a product kansei evaluation vector matrix;
S2: subjecting the product kansei evaluation vector matrix to dimensionality reduction based on principal components:
S21: zero-centering each row in the product kansei evaluation vector matrix;
S22: obtaining a covariance matrix of the product kansei evaluation vector matrix after zero-centering;
S23: subjecting the covariance matrix obtained in step S22 to orthogonal decomposition to obtain eigenvalues and eigenvectors of the covariance matrix; and
S24: arranging the eigenvalues in a descending order, and extracting the eigenvectors of first f principal components with a cumulative contribution rate greater than a first threshold to form an eigenvector matrix;
S3: obtaining a principal component load factor matrix, and constructing a principal component load factor table; and
S4: extracting kansei adjectives representing the principal components according to a kansei adjective extraction strategy.

Step S1 includes: constructing the product kansei evaluation vector matrix according to kansei evaluation vectors of different users for a same product or same product category;
where, the product kansei evaluation vector matrix constructed for an m-th product or product category $C_m$ is as follows:

$$V_m = \begin{bmatrix} x_{m,1}^1 & \cdots & x_{m,1}^k \\ \vdots & \ddots & \vdots \\ x_{m,n}^1 & \cdots & x_{m,n}^k \end{bmatrix} \quad (1)$$

where, $x_{m,n}^k$ denotes an evaluation score of a user $P_k$ for an n-th kansei adjective $K_n$ of the product or product category $C_m$; m, n, and k are integers; a common evaluation criterion for the product kansei evaluation vector matrix $V_m$ is a 5-, 7- or 9-point Likert scale; $KW_n = (kw_n^-, kw_n^+)$ denotes a pair of antonyms for expressing an attribute of the kansei adjective $K_n$, where $kw_n^-$ and $kw_n^+$ denote left and right antonyms, respectively.

Step S2 is designed to reduce the dimensionality of the product kansei evaluation vector matrix, such that there is no correlation or weak correlation between the obtained principal components to make the research results more rigorous and reasonable.

Step S21 includes: zero-centering each row in the product kansei evaluation vector matrix $V_m$, that is, subtracting a mean value of each row from each element in the corresponding row in the product kansei evaluation vector matrix $V_m$ to obtain a product kansei evaluation vector matrix $V'_m$ after zero-centering.

Step S22 includes: obtaining a variance matrix of the product kansei evaluation vector matrix $V'_m$ after zero-centering:

$$C = \frac{1}{n} V'_m V'^T_m \quad (2)$$

where, n denotes a total number of kansei adjectives.

Step S23 includes: subjecting the variance matrix C to orthogonal decomposition:

$$C = P\lambda P^T \quad (3)$$

where, $\lambda = \text{diag}(\lambda_1, \lambda_2, \ldots, \lambda_n)$, $\lambda_i$ (i=1,2,3, ..., n), denotes eigenvalues of the variance matrix C, which are arranged in a descending order from $\lambda_1$ to $\lambda_n$; and $P=[P_1, P_2, \ldots, P_n]$, $P_i$ (i=1,2,3, ..., n), denotes a feature column vector corresponding to $\lambda_i$, and the feature column vector is referred to as an i-th principal component direction.

Step S24 includes: calculating the cumulative contribution rate after projection in the principal component direction:

$$\theta = \left(\sum_{i=1}^{f} \lambda_i\right) / \left(\sum_{i=1}^{n} \lambda_i\right), \text{ and} \quad (4)$$

extracting, according to the set first threshold, the first f eigenvectors to form an eigenvector matrix P', $P'=[P_1, P_2, \ldots, P_f]$, f<n.

Step S3 is designed to obtain the principal component load factor table, and includes:
S31: obtaining the principal component load factor matrix based on principal component eigenvalues and specific vectors; and
S32: constructing the principal component load factor table through the principal component load factor matrix;

Step S31 includes: calculating a principal component load factor matrix F:

$$F_{ij} = \sqrt{\lambda_i} p_{ij} \quad (5)$$

where, $F_{ij}$ denotes an i-th principal component load factor of a j-th kansei adjective; $p_Y$ denotes a j-th element in an eigenvector $P_i$; i=1,2,3, ..., f; and j=1,2,3, ..., n.

In step S32, the principal component load factor table mainly includes kansei adjectives (i.e. a pair of antonyms), principal components, and principal component load factors corresponding to the kansei adjectives.

Step S4 is designed to extract the kansei adjectives representing the principal component from the principal component load factor table, and includes: cleaning data in the principal component load factor table, where each kansei adjective corresponds to only one principal component load factor; and sequentially extracting, according to the kansei adjective extraction strategy, the kansei adjectives representing the principal components.

The cleaning data in the principal component load factor table includes:
(1) eliminating a principal component load factor less than a second threshold in the principal component load factor table; and
(2) retaining a last principal component load factor of a kansei adjective in an order of the principal components.

Further, when the kansei adjectives representing the principal components are extracted according to the kansei adjective extraction strategy, corresponding explanations are given to obtain key explanatory kansei adjectives.

The kansei adjective extraction strategy specifically includes:
(1) if the corresponding principal component load factor of the kansei adjective is less than 0: exchanging the left and right antonyms of the kansei adjective in position, screening according to strategies (2) to (4), and further explaining;
(2) if the principal component corresponds to only one kansei adjective: taking the corresponding kansei adjective as the kansei adjective to represent the principal component, where it can further be explained that the kansei adjective is the only evaluation criterion for the attribute of the kansei adjective;
(3) if the principal component corresponds to at least two kansei adjectives that are semantically similar: selecting any kansei adjective as the kansei adjective to represent the principal component, where it can further be explained that the kansei adjective is the only evaluation criterion for the attribute of the kansei adjective; and
(4) if the principal component corresponds to at least two kansei adjectives that are not semantically similar: removing a kansei adjective that is semantically similar to another principal component, and selecting any remaining kansei adjective as the kansei adjective to represent the principal component, where it can further be explained that the evaluation of the principal component needs to consider all factors, and even the user can be reminded of focusing on a factor according to a difference in proportion.

When the kansei adjective extraction strategy is used, the extraction can be carried out according to an ascending order of the number of the principal component load factors.

The at least two kansei adjectives are semantically similar, that is, the at least two kansei adjectives are synonyms, and the at least two kansei adjectives are easy to be combined into one.

The at least two kansei adjectives are not semantically similar, that is, the at least two kansei adjectives are not synonyms, they are quite different in terms of semantic expression, or they are hard to be combined into one.

In the present disclosure, the method for extracting a kansei adjective of a product based on PCA-E has the following beneficial effects:

(1) The present disclosure constructs the product kansei evaluation vector matrix through the original kansei adjectives, performs dimensionality reduction through the PCA, and determines the kansei adjectives representing each principal component based on the principal component load factor. In this way, the kansei adjectives extracted by the present disclosure are explanatory to help users understand the selected kansei adjectives and make an accurate evaluation.

(2) The present disclosure can be realized based on fewer evaluation samples, greatly reducing labor costs.

(3) The present disclosure can be expanded to deal with a large scale of original kansei adjectives.

(4) The present disclosure optimizes the screening process of kansei adjectives based on the PCA and kansei adjective extraction strategy, and has potential value for the research and application of kansei engineering and product design.

DETAILED DESCRIPTION OF THE EMBODIMENTS

The technical solutions in the embodiments of the present disclosure are clearly and completely described below with reference to the drawings. Apparently, the described embodiments are merely some rather than all of the embodiments of the present disclosure. All other embodiments obtained by a person of ordinary skill in the art based on the embodiments of the present disclosure without creative efforts shall fall within the present disclosure.

Embodiment

Figure 1:
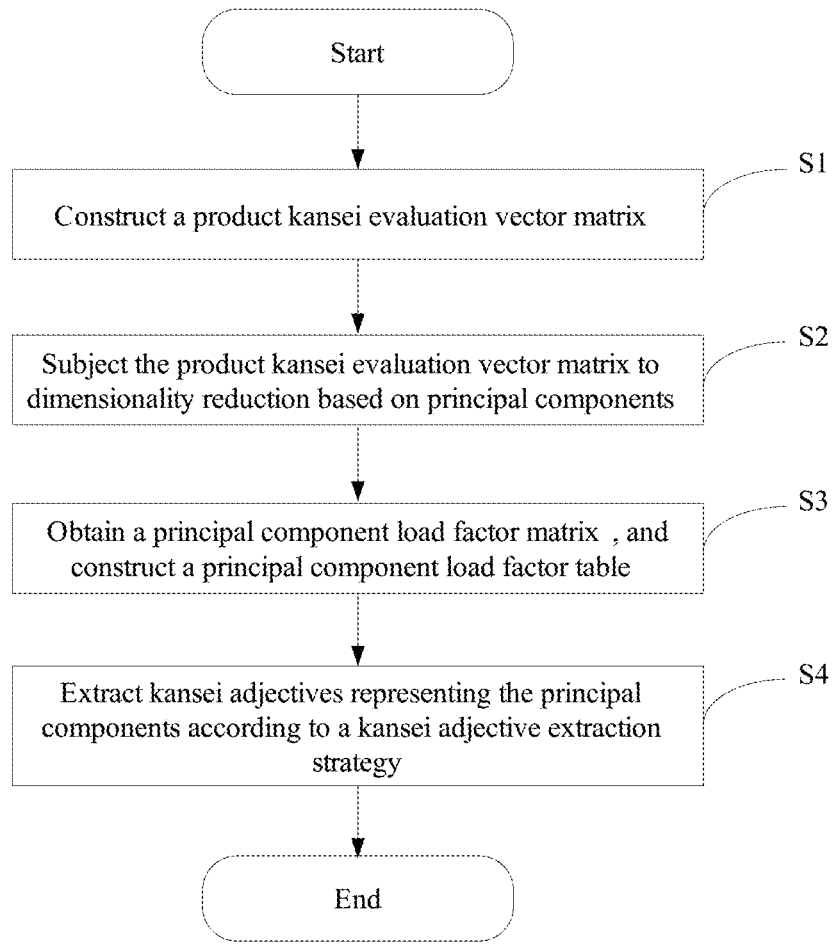
FIG. 1 is a flowchart of a method for extracting a kansei adjective of a product based on PCA-E according to the present disclosure.

As shown in FIG. 1, in this embodiment, a method for extracting a kansei adjective of a product based on PCA-E includes the following steps.

S1. A product kansei evaluation vector matrix is constructed.

Kansei adjectives are important for users to describe products. Screening out scientific and reasonable kansei adjectives is of great significance for designers to understand users' emotional needs. In order to explain the relationship between users, kansei evaluation and products, a semantic differential (SD) method is first used to establish a kansei semantic space.

1) $C=\{C_1, C_2, \ldots, C_m\}$ denotes products or product categories to be evaluated, where m denotes a number of the products or product categories.

2) $P=(P_1, P_2, \ldots, P_k)$ denotes users participating in evaluation, where k denotes a number of the users.

3) $K=\{K_1, K_2, \ldots, K_n\}$ denotes a set of preliminarily selected kansei adjectives, where n denotes a number of the kansei adjectives.

4) $KW_n=(kw_n^-, kw_n^+)$ denotes a pair of antonyms expressing an attribute of the kansei adjective, where $kw_n^-$ and $kw_n^+$ denotes left and right antonyms, respectively.

5) $V=\{V_1, V_2, \ldots, V_g\}$ denotes users' evaluation scores of a kansei adjective of a product, where g denotes a point number of a Likert evaluation method, and a commonly used evaluation criterion is 5-, 7- or 9-point Likert scale; for example, if the 5-point Likert evaluation method is selected, then $V=\{1,2,3,4,5\}$.

6) $x_{m,n}^k$ denotes an evaluation score of user $P_k$ for kansei adjective $K_n$ of product $C_m$. For a selected product or product category $C_m$, the evaluation of the user $P_k$ for n kansei adjectives can be written as:

$$V_m^k=\{x_{m,1}^k, x_{m,2}^k, \ldots, x_{m,n-1}^k, x_{m,n}^k\}$$

7) The evaluation of $V_m^k$ is taken as a column vector, and the evaluation of k users for the n kansei adjectives of the product $C_m$ can be written as:

$$V_m = \begin{bmatrix} x_{m,1}^1 & \cdots & x_{m,1}^k \\ \vdots & \ddots & \vdots \\ x_{m,n}^1 & \cdots & x_{m,n}^k \end{bmatrix} \quad (1)$$

Thus, an n×k-order data matrix is formed.

When the kansei evaluation attribute of a product is determined, $V_m$ accurately expresses the kansei semantic evaluation of a product by multiple users, which is of great significance for screening the kansei adjectives of the product.

S2. The product kansei evaluation vector matrix is subjected to dimensionality reduction based on principal components:

S21. Each row in the product kansei evaluation vector matrix is zero-centered.

In this step, each row in the product kansei evaluation vector matrix $V_m$ is zero-centered, that is, a mean value of each row is subtracted from each element in the corresponding row in the product kansei evaluation vector matrix $V_m$ to obtain a product kansei evaluation vector matrix $V'_m$ after zero-centering.

S22. A covariance matrix of the product kansei evaluation vector matrix after zero-centering is obtained.

A variance matrix of the product kansei evaluation vector matrix V'm after zero-centering is obtained as follows:

$$C = \frac{1}{n} V'_m V'^T_m \quad (2)$$

where, n denotes a total number of kansei adjectives.

S23. The covariance matrix obtained in step S22 is subjected to orthogonal decomposition to obtain eigenvalues and eigenvectors of the covariance matrix.

In this step, the variance matrix C is subjected to orthogonal decomposition:

$$C=P\lambda P^T \quad (3)$$

where, $\lambda=\text{diag}(\lambda_1, \lambda_2, \ldots, \lambda_n)$, $\lambda_i$ (i=1,2,3, ..., n), denotes eigenvalues of the variance matrix C, which are arranged in a descending order from $\lambda_1$ to $\lambda_n$; and $P=[P_1, P_2, \ldots, P_n]$, $P_i$ (i=1,2,3, ..., n), denotes a feature column vector corresponding to $\lambda_i$, and the feature column vector is referred to as an i-th principal component direction.

S24. The eigenvalues are arranged in a descending order, and the eigenvectors of first f principal components with a cumulative contribution rate greater than a first threshold are extracted to form an eigenvector matrix.

In this step, the cumulative contribution rate after projection in the principal component direction is calculated as follows:

$$\theta = \left(\sum_{i=1}^{f}\lambda_i\right) / \left(\sum_{i=1}^{n}\lambda_i\right) \quad (4)$$

According to the set first threshold, the first f eigenvectors are extracted to form an eigenvector matrix P', P'=[$P_1$, $P_2$, ..., $P_f$], f<n.

S3. A principal component load factor matrix is obtained, and a principal component load factor table is constructed.

S31. The principal component load factor matrix is obtained based on principal component eigenvalues and specific vectors.

In this step, a principal component load factor matrix F is calculated as follows:

$$F_{ij} = \sqrt{\lambda_i} p_{ij} \quad (5)$$

where, $F_{ij}$ denotes an i-th principal component load factor of a j-th kansei adjective; $p_{ij}$ denotes a j-th element in an eigenvector $P_i$; i=1,2,3, ..., f; and j=1,2,3, ..., n.

S32. The principal component load factor table is constructed through the principal component load factor matrix.

In this step, the principal component load factor table mainly includes kansei adjectives (i.e. a pair of antonyms), principal components, and principal component load factors corresponding to the kansei adjectives.

S4. Kansei adjectives representing the principal components are extracted according to a kansei adjective extraction strategy.

In this step, data in the principal component load factor table is cleaned, where each kansei adjective corresponds to only one principal component load factor; and according to the kansei adjective extraction strategy, the kansei adjectives representing the principal components are sequentially extracted.

The cleaning data in the principal component load factor table includes:
(1) A principal component load factor less than a second threshold in the principal component load factor table is eliminated.
(2) A last principal component load factor of a kansei adjective in an order of the principal components is retained.

The kansei adjective extraction strategy specifically includes:
(1) If the corresponding principal component load factor of the kansei adjective is less than 0: the left and right antonyms of the kansei adjective are exchanged in position, screening is performed according to strategies (2) to (4), and a further explanation is given.
(2) If the principal component corresponds to only one kansei adjective: the corresponding kansei adjective is taken as the kansei adjective to represent the principal component, where it can further be explained that the kansei adjective is the only evaluation—criterion for the attribute of the kansei adjective.
(3) If the principal component corresponds to at least two kansei adjectives that are semantically similar: any kansei adjective is selected as the kansei adjective to represent the principal component, where it can further be explained that the kansei adjective is the only evaluation criterion for the attribute of the kansei adjective.
(4) If the principal component corresponds to at least two kansei adjectives that are not semantically similar: a kansei adjective that is semantically similar to other principal component is removed, and any remaining kansei adjective is selected as the kansei adjective to represent the principal component, where it can further be explained that the evaluation of the principal component needs to consider all factors, and the user can be reminded of focusing on a factor according to a difference in proportion.

The at least two kansei adjectives are semantically similar, that is, the at least two kansei adjectives are synonyms, and the at least two kansei adjectives are easy to be combined into one.

The at least two kansei adjectives are not semantically similar, that is, the at least two kansei adjectives are not synonyms, they are quite different in terms of semantic expression, or they are hard to be combined into one.

Application Example

Figure 2:
FIG. 2 shows a sample image used in an application example.

The research data of this application example is from Stanford Cars Dataset. This application example is only for the kansei evaluation of a certain car (certain car category). A car image was randomly selected as the product sample, as shown in FIG. 2. At least 100 kansei adjectives related to the car image were collected. Kansei adjectives with a high coincidence rate were removed, and kansei adjectives with independent meanings were matched to generate a total of 30 pairs of kansei adjectives (pairs of antonyms).

Questionnaires were made by the SD method. Specifically, 40 respondents (including 34 male students and 6 female students, aged 18-31) were invited to evaluate the 30 pairs of kansei adjectives of the car image by using the 7-point Likert scale evaluation method. The results are shown in Table 1.

| Different respondents' evaluation scores on different kansei adjectives of the same product | | | | | | | | | | | | | | | | | | | | | |
|---|---|---|---|---|---|---|---|---|---|---|---|---|---|---|---|---|---|---|---|---|
| Pairs of kansei | Respondent No. | | | | | | | | | | | | | | | | | | | | |
| adjectives | 1 | 2 | 3 | 4 | 5 | 6 | 7 | 8 | 9 | 10 | 11 | 12 | 13 | 14 | 15 | 16 | 17 | 18 | 19 | 20 |
| Traditional-fashionable | 7 | 6 | 7 | 6 | 7 | 7 | 1 | 3 | 4 | 7 | 7 | 5 | 4 | 5 | 7 | 7 | 7 | 7 | 7 | 7 |
| Modest-cool | 7 | 6 | 7 | 6 | 7 | 7 | 1 | 4 | 5 | 7 | 7 | 6 | 7 | 6 | 7 | 7 | 7 | 7 | 7 | 7 |
| Warm-calm | 2 | 2 | 1 | 3 | 1 | 4 | 1 | 2 | 7 | 7 | 1 | 2 | 4 | 2 | 7 | 1 | 1 | 1 | 3 | 5 |
| Stiff-dynamic | 7 | 6 | 7 | 5 | 7 | 7 | 1 | 4 | 4 | 7 | 7 | 4 | 4 | 6 | 7 | 7 | 7 | 7 | 7 | 7 |
| Local-foreign | 7 | 6 | 7 | 5 | 7 | 7 | 1 | 4 | 4 | 7 | 7 | 5 | 4 | 5 | 7 | 7 | 7 | 7 | 7 | 7 |

-continued

| Different respondents' evaluation scores on different kansei adjectives of the same product | | | | | | | | | | | | | | | | | | | | |
|---|---|---|---|---|---|---|---|---|---|---|---|---|---|---|---|---|---|---|---|---|
| Dim-bright | 7 | 6 | 7 | 6 | 7 | 7 | 7 | 3 | 7 | 7 | 7 | 5 | 4 | 5 | 7 | 7 | 7 | 6 | 6 | 7 |
| Delicate-aggressive | 6 | 6 | 7 | 6 | 6 | 7 | 7 | 4 | 4 | 3 | 7 | 3 | 4 | 5 | 7 | 7 | 7 | 5 | 6 | 6 |
| Dull-active | 6 | 6 | 7 | 5 | 6 | 7 | 7 | 5 | 4 | 5 | 7 | 2 | 4 | 5 | 7 | 7 | 7 | 5 | 6 | 7 |
| Classic-popular | 7 | 6 | 7 | 4 | 6 | 7 | 1 | 1 | 4 | 5 | 6 | 1 | 5 | 5 | 6 | 7 | 7 | 2 | 6 | 7 |
| Ordinary-chic | 7 | 6 | 7 | 5 | 6 | 7 | 1 | 1 | 1 | 7 | 7 | 1 | 4 | 5 | 6 | 7 | 7 | 5 | 6 | 7 |
| Gloomy-distinctive | 7 | 6 | 7 | 6 | 7 | 7 | 1 | 4 | 7 | 7 | 7 | 2 | 4 | 5 | 7 | 7 | 7 | 5 | 6 | 6 |
| Complex-concise | 7 | 6 | 1 | 6 | 2 | 6 | 7 | 1 | 4 | 6 | 6 | 3 | 4 | 5 | 7 | 6 | 1 | 3 | 6 | 6 |
| Plain-luxury | 7 | 6 | 7 | 6 | 4 | 7 | 7 | 4 | 7 | 7 | 7 | 5 | 4 | 5 | 7 | 7 | 7 | 5 | 5 | 7 |
| Leisure-formal | 1 | 2 | 1 | 3 | 4 | 5 | 1 | 1 | 1 | 5 | 2 | 6 | 4 | 5 | 4 | 4 | 7 | 3 | 5 | 2 |
| Stagnant-smooth | 6 | 6 | 7 | 5 | 4 | 6 | 1 | 7 | 7 | 7 | 6 | 6 | 4 | 5 | 7 | 7 | 7 | 5 | 6 | 6 |
| Female-male | 5 | 6 | 7 | 4 | 4 | 4 | 7 | 7 | 7 | 7 | 4 | 5 | 5 | 5 | 7 | 7 | 7 | 5 | 6 | 6 |
| Light-bulky | 1 | 2 | 1 | 2 | 2 | 2 | 7 | 1 | 4 | 1 | 2 | 3 | 5 | 3 | 1 | 1 | 1 | 3 | 5 | 1 |
| Monotonous-vivid | 6 | 6 | 7 | 5 | 5 | 5 | 1 | 4 | 4 | 1 | 7 | 2 | 5 | 5 | 7 | 5 | 7 | 5 | 5 | 6 |
| Vulgar-elegant | 5 | 4 | 7 | 5 | 4 | 5 | 1 | 4 | 1 | 4 | 5 | 5 | 4 | 5 | 1 | 6 | 7 | 5 | 6 | 6 |
| Simple-noble | 7 | 6 | 7 | 5 | 5 | 6 | 1 | 4 | 4 | 6 | 6 | 5 | 4 | 5 | 7 | 6 | 7 | 5 | 6 | 7 |
| Sumptuous-naive | 6 | 6 | 7 | 5 | 5 | 6 | 7 | 4 | 4 | 7 | 6 | 3 | 4 | 5 | 7 | 7 | 7 | 5 | 5 | 7 |
| Ugly-beautiful | 7 | 6 | 7 | 6 | 7 | 7 | 1 | 5 | 4 | 7 | 7 | 5 | 4 | 5 | 7 | 7 | 7 | 5 | 5 | 7 |
| Gorgeous-simple | 7 | 6 | 7 | 5 | 7 | 7 | 7 | 5 | 4 | 7 | 7 | 6 | 4 | 5 | 7 | 5 | 7 | 3 | 3 | 6 |
| Feminine-robust | 6 | 6 | 7 | 5 | 5 | 6 | 7 | 6 | 4 | 7 | 7 | 6 | 4 | 5 | 7 | 7 | 7 | 5 | 6 | 6 |
| Quiet-bright | 6 | 6 | 7 | 3 | 6 | 6 | 7 | 4 | 7 | 7 | 7 | 6 | 4 | 5 | 7 | 6 | 7 | 5 | 2 | 6 |
| Soft-hard | 6 | 6 | 7 | 5 | 6 | 6 | 7 | 5 | 4 | 5 | 7 | 2 | 5 | 5 | 7 | 7 | 7 | 5 | 6 | 7 |
| Young-mature | 3 | 4 | 7 | 4 | 5 | 6 | 7 | 4 | 4 | 5 | 6 | 3 | 4 | 5 | 7 | 7 | 7 | 5 | 5 | 6 |
| Small-big | 6 | 4 | 7 | 4 | 5 | 5 | 7 | 5 | 4 | 5 | 7 | 5 | 4 | 5 | 7 | 7 | 7 | 3 | 6 | 7 |
| Popular-personalized | 7 | 6 | 7 | 6 | 5 | 6 | 7 | 4 | 7 | 7 | 7 | 3 | 4 | 5 | 7 | 7 | 7 | 5 | 6 | 7 |
| Lively-steady | 2 | 2 | 1 | 2 | 5 | 5 | 1 | 3 | 4 | 5 | 4 | 3 | 4 | 5 | 1 | 1 | 1 | 3 | 1 | 3 |

| Pairs of kansei adjectives | Respondent No. | | | | | | | | | | | | | | | | | | | |
|---|---|---|---|---|---|---|---|---|---|---|---|---|---|---|---|---|---|---|---|---|
| | 21 | 22 | 23 | 24 | 25 | 26 | 27 | 28 | 29 | 30 | 31 | 32 | 33 | 34 | 35 | 36 | 37 | 38 | 39 | 40 |
| Traditional-fashionable | 7 | 7 | 6 | 3 | 7 | 7 | 7 | 6 | 4 | 6 | 7 | 7 | 1 | 6 | 4 | 7 | 6 | 4 | 7 | 6 |
| Modest-cool | 7 | 7 | 6 | 5 | 7 | 7 | 7 | 6 | 7 | 7 | 7 | 7 | 2 | 6 | 5 | 7 | 7 | 4 | 7 | 6 |
| Warm-calm | 1 | 1 | 2 | 6 | 2 | 1 | 2 | 4 | 1 | 1 | 1 | 2 | 6 | 2 | 5 | 1 | 2 | 5 | 7 | 6 |
| Stiff-dynamic | 7 | 7 | 6 | 2 | 6 | 7 | 6 | 4 | 7 | 7 | 7 | 7 | 2 | 6 | 5 | 7 | 6 | 4 | 7 | 6 |
| Local-foreign | 7 | 7 | 4 | 3 | 6 | 7 | 6 | 6 | 7 | 6 | 5 | 5 | 2 | 6 | 4 | 7 | 6 | 4 | 7 | 6 |
| Dim-bright | 7 | 7 | 5 | 3 | 6 | 7 | 6 | 5 | 7 | 6 | 6 | 7 | 2 | 5 | 4 | 7 | 6 | 4 | 7 | 6 |
| Delicate-aggressive | 7 | 7 | 2 | 3 | 6 | 7 | 6 | 4 | 7 | 4 | 6 | 7 | 2 | 6 | 4 | 7 | 6 | 4 | 7 | 6 |
| Dull-active | 6 | 7 | 6 | 3 | 6 | 6 | 6 | 5 | 7 | 6 | 5 | 6 | 1 | 5 | 4 | 7 | 6 | 4 | 7 | 6 |
| Classic-popular | 6 | 7 | 4 | 6 | 4 | 4 | 6 | 4 | 7 | 6 | 6 | 7 | 1 | 6 | 4 | 7 | 6 | 4 | 7 | 6 |
| Ordinary-chic | 7 | 7 | 5 | 6 | 6 | 6 | 7 | 4 | 7 | 5 | 6 | 2 | 1 | 5 | 4 | 7 | 6 | 4 | 7 | 6 |
| Gloomy-distinctive | 7 | 7 | 5 | 6 | 6 | 7 | 6 | 5 | 7 | 6 | 6 | 7 | 1 | 5 | 4 | 7 | 6 | 4 | 7 | 6 |
| Complex-concise | 7 | 6 | 5 | 6 | 2 | 5 | 6 | 4 | 4 | 4 | 4 | 2 | 1 | 3 | 4 | 7 | 5 | 4 | 7 | 6 |
| Plain-luxury | 7 | 7 | 5 | 6 | 7 | 7 | 7 | 5 | 7 | 7 | 6 | 7 | 1 | 6 | 4 | 7 | 5 | 4 | 7 | 6 |
| Leisure-formal | 1 | 3 | 2 | 2 | 1 | 1 | 1 | 3 | 4 | 2 | 3 | 2 | 7 | 4 | 4 | 1 | 3 | 4 | 7 | 6 |
| Stagnant-smooth | 6 | 6 | 6 | 6 | 7 | 6 | 7 | 4 | 4 | 5 | 6 | 6 | 1 | 5 | 5 | 7 | 5 | 4 | 7 | 6 |
| Female-male | 5 | 7 | 2 | 6 | 4 | 4 | 7 | 5 | 7 | 5 | 4 | 7 | 1 | 5 | 6 | 3 | 6 | 4 | 7 | 6 |
| Light-bulky | 1 | 1 | 2 | 2 | 1 | 4 | 1 | 3 | 4 | 3 | 2 | 2 | 7 | 2 | 5 | 7 | 3 | 4 | 7 | 6 |
| Monotonous-vivid | 6 | 6 | 6 | 6 | 6 | 4 | 7 | 4 | 7 | 6 | 6 | 2 | 1 | 5 | 5 | 7 | 5 | 4 | 7 | 6 |
| Vulgar-elegant | 3 | 4 | 3 | 4 | 2 | 4 | 7 | 4 | 4 | 5 | 5 | 6 | 5 | 5 | 5 | 7 | 4 | 4 | 7 | 6 |
| Simple-noble | 6 | 7 | 4 | 4 | 5 | 7 | 7 | 4 | 7 | 4 | 7 | 4 | 3 | 6 | 5 | 7 | 5 | 4 | 7 | 6 |
| Sumptuous-naive | 7 | 7 | 4 | 4 | 4 | 7 | 7 | 5 | 4 | 5 | 7 | 4 | 4 | 6 | 5 | 7 | 5 | 5 | 7 | 6 |
| Ugly-beautiful | 7 | 7 | 5 | 6 | 5 | 7 | 7 | 5 | 7 | 6 | 7 | 4 | 3 | 5 | 5 | 7 | 5 | 5 | 7 | 6 |
| Gorgeous-simple | 7 | 6 | 5 | 6 | 6 | 7 | 7 | 4 | 4 | 6 | 5 | 4 | 5 | 5 | 5 | 7 | 5 | 3 | 7 | 6 |
| Feminine-robust | 5 | 7 | 4 | 6 | 6 | 6 | 7 | 4 | 7 | 4 | 6 | 7 | 3 | 6 | 5 | 7 | 5 | 5 | 7 | 6 |
| Quiet-bright | 7 | 7 | 6 | 5 | 4 | 7 | 7 | 4 | 7 | 6 | 5 | 4 | 5 | 5 | 5 | 7 | 6 | 5 | 7 | 6 |
| Soft-hard | 7 | 7 | 4 | 6 | 6 | 7 | 7 | 4 | 4 | 4 | 6 | 7 | 7 | 6 | 5 | 7 | 6 | 5 | 7 | 6 |
| Young-mature | 6 | 6 | 3 | 5 | 4 | 2 | 7 | 4 | 5 | 4 | 6 | 7 | 4 | 5 | 5 | 7 | 5 | 5 | 7 | 6 |
| Small-big | 7 | 7 | 4 | 6 | 2 | 4 | 7 | 4 | 7 | 4 | 6 | 5 | 6 | 5 | 5 | 7 | 4 | 5 | 7 | 6 |
| Popular-personalized | 7 | 7 | 6 | 6 | 5 | 6 | 7 | 6 | 7 | 7 | 7 | 5 | 5 | 5 | 5 | 7 | 6 | 5 | 7 | 6 |
| Lively-steady | 2 | 1 | 2 | 2 | 2 | 1 | 1 | 3 | 6 | 2 | 1 | 3 | 3 | 5 | 5 | 2 | 2 | 5 | 7 | 6 |

Based on Table 1, the product kansei evaluation vector matrix $C_m$ is constructed according to step S1 in the embodiment.

PCA is performed according to step S2 in the embodiment, and the first seven principal components with a cumulative contribution rate greater than 80% (a first threshold is set to 80%) are extracted according to the eigenvalues. The extraction information of each principal component is shown in Table 2.

TABLE 2

Extraction information of principal components

| | Principal component extraction | |
|---|---|---|
| No. | Eigenvalue | Cumulative contribution rate |
| 1 | 12.969 | 43.231 |
| 2 | 3.559 | 55.094 |

TABLE 2-continued

Extraction information of principal components

| | Principal component extraction | |
|---|---|---|
| No. | Eigenvalue | Cumulative contribution rate |
| 3 | 2.398 | 63.087 |
| 4 | 1.727 | 68.844 |
| 5 | 1.521 | 73.915 |
| 6 | 1.306 | 78.27 |
| 7 | 1.143 | 82.08 |

According to step S3 in the embodiment, the principal component load factor table is obtained, as shown in Table 3.

TABLE 3

Principal component load factors

| Pairs of antonyms | Load factors | | | | | | |
|---|---|---|---|---|---|---|---|
| | Principal component | Principal component | Principal component | Principal component | Principal component | Principal component | Principal component |
| Traditional-fashionable | 0.809 | −0.438 | −0.071 | −0.071 | −0.028 | 0.077 | 0.05 |
| Modest-cool | 0.748 | −0.588 | −0.012 | 0.009 | 0.049 | 0.078 | −0.008 |
| Warm-calm | −0.248 | 0.083 | 0.452 | 0.645 | 0.156 | −0.187 | −0.256 |
| Stiff-dynamic | 0.823 | −0.419 | 0.04 | −0.088 | −0.005 | 0.184 | 0.107 |
| Local-foreign | 0.832 | −0.402 | 0.079 | −0.006 | 0 | 0.122 | 0.148 |
| Dim-bright | 0.797 | 0.144 | −0.194 | 0.106 | 0.11 | 0.393 | 0.232 |
| Delicate-aggressive | 0.761 | 0.271 | −0.052 | −0.303 | 0.1 | 0.335 | 0.009 |
| Dull-active | 0.816 | 0.197 | −0.161 | −0.092 | 0.059 | 0.334 | −0.024 |
| Classic-popular | 0.817 | −0.118 | 0.213 | 0.02 | 0.026 | 0.07 | −0.285 |
| Ordinary-chic | 0.848 | −0.186 | 0.159 | 0.052 | −0.273 | −0.012 | −0.138 |
| Gloomy-distinctive | 0.847 | −0.286 | −0.068 | 0.195 | 0.086 | 0.063 | −0.14 |
| Complex-concise | 0.406 | 0.329 | 0.02 | 0.474 | −0.259 | 0.17 | −0.303 |
| Plain-luxury | 0.783 | 0.212 | −0.302 | 0.229 | 0.206 | 0.092 | 0.06 |
| Leisure-formal | −0.236 | −0.176 | 0.806 | −0.027 | 0.066 | 0.085 | 0.243 |
| Stagnant-smooth | 0.646 | −0.325 | −0.124 | 0.184 | 0.285 | −0.393 | −0.036 |
| Female-male | 0.357 | 0.296 | −0.037 | 0.127 | 0.765 | −0.117 | −0.06 |
| Light-bulky | −0.409 | 0.343 | 0.478 | 0.04 | −0.156 | 0.443 | −0.046 |
| Monotonous-vivid | 0.663 | −0.216 | 0.057 | −0.004 | −0.192 | −0.084 | −0.326 |
| Vulgar-elegant | 0.352 | −0.204 | 0.573 | −0.482 | 0.013 | −0.166 | −0.008 |
| Simple-noble | 0.84 | −0.249 | 0.227 | −0.003 | −0.073 | −0.173 | 0.063 |
| Sumptuous-naive | 0.735 | 0.433 | 0.083 | −0.042 | −0.213 | −0.06 | 0.053 |
| Ugly-beautiful | 0.825 | −0.31 | 0.149 | 0.123 | −0.178 | −0.261 | 0.072 |
| Gorgeous-simple | 0.526 | 0.354 | −0.025 | 0.147 | −0.317 | −0.29 | 0.446 |
| Feminine-robust | 0.682 | 0.354 | 0.043 | −0.148 | 0.377 | −0.139 | 0.167 |
| Quiet-bright | 0.496 | 0.422 | 0.012 | 0.34 | −0.169 | −0.091 | 0.477 |
| Soft-hard | 0.527 | 0.488 | 0.1 | −0.356 | −0.184 | −0.078 | −0.181 |
| Young-mature | 0.532 | 0.516 | 0.296 | −0.256 | 0.277 | −0.017 | −0.159 |
| Small-big | 0.484 | 0.59 | 0.372 | −0.132 | −0.018 | −0.249 | −0.042 |
| Popular-personalized | 0.696 | 0.409 | −0.067 | 0.247 | −0.184 | 0.05 | −0.194 |
| Lively-steady | −0.187 | −0.192 | 0.632 | 0.369 | 0.213 | 0.309 | 0.191 |

According to step S4 in the embodiment, for any principal component in the principal component load factor table, the load factor less than 0.4 (a second threshold is set to 0.4) is removed. For a kansei adjective, the last principal component load factor in the order of the principal components is retained, such that each kansei adjective corresponds to only one principal component load factor, thus avoiding the occurrence of one pair corresponding to multiple principal components. The obtained principal component load factors for corresponding variables are shown in Table 4.

TABLE 4

Principal component load factors for corresponding variables

| Name | Principal component 1 | Principal component 2 | Principal component 3 | Principal component 4 | Principal component 5 | Principal component 6 | Principal component 7 |
|---|---|---|---|---|---|---|---|
| Traditional-fashionable | | −0.438 | | | | | |
| Modest-cool | | −0.588 | | | | | |
| Warm-calm | | | | 0.645 | | | |
| Stiff-dynamic | | −0.419 | | | | | |
| Local-foreign | | −0.402 | | | | | |
| Dim-bright | 0.797 | | | | | | |
| Delicate-aggressive | 0.761 | | | | | | |
| Dull-active | 0.816 | | | | | | |
| Classic-popular | 0.817 | | | | | | |
| Ordinary-chic | 0.848 | | | | | | |
| Gloomy-distinctive | 0.847 | | | | | | |
| Complex-concise | | | | 0.474 | | | |
| Plain-luxury | 0.783 | | | | | | |
| Leisure-formal | | | 0.806 | | | | |
| Stagnant-smooth | 0.646 | | | | | | |
| Female-male | | | | | 0.765 | | |
| Light-bulky | | | | | | 0.443 | |
| Monotonous-vivid | 0.663 | | | | | | |
| Vulgar-elegant | | | −0.482 | | | | |
| Simple-noble | 0.84 | | | | | | |
| Sumptuous-naive | | 0.433 | | | | | |
| Ugly-beautiful | 0.825 | | | | | | |
| Gorgeous-simple | | | | | | | 0.446 |
| Feminine-robust | 0.682 | | | | | | |
| Quiet-bright | | | | | | | 0.477 |
| Soft-hard | | 0.488 | | | | | |
| Young-mature | | 0.516 | | | | | |
| Small-big | | 0.59 | | | | | |
| Popular-personalized | | 0.409 | | | | | |
| Lively-steady | | | 0.632 | | | | |

According to the kansei adjective extraction strategy in the embodiment, the kansei adjectives representing the principal components are extracted.

According to Table 4, the principal component 5 corresponds to the PCA-E-based kansei adjective extraction strategy (2). The kansei adjectives "female-male" are absolutely dominant, are thus used to denote the principal component 5. The principal component 5 only focuses on the gender trend of product users. In the same way, the kansei adjectives "light-bulky" are used to denote the principal component 6, the principal component 6 only focuses on the complexity of the product structure.

According to Table 4, the principal component 7 corresponds to the PCA-E-based kansei adjective extraction strategy (3). The two pairs of kansei adjectives ("gorgeous-simple" and "quiet-bright") have similar load factors, and are semantically close and easy to be combined into one. Therefore, the two pairs of kansei adjectives are combined into "bright-quiet". The principal component 7 can be interpreted as the brightness of the product. Similarly, the kansei adjectives "leisure-formal" are used to denote the principal component 3, the principal component 3 only focuses on the appropriate occasions of the product.

According to Table 4, the principal components 1, 2, and 4 each are formed by multiple kansei adjectives with different semantics and different expressions, and correspond to the PCA-E-based kansei adjective extraction strategy (4). According to the PCA-E-based kansei adjective extraction strategy (1), the principal component 1 focuses more on the particularity of the product, the principal component 2 focuses more the fashion of the product, and the principal component 4 focuses more the personality characteristic of the product user. In order to explain each of the principal components and verify the accuracy of extraction, a pair of antonyms is selected to replace and explain the principal component, as shown in Table 5.

TABLE 5

PCA-E-based screening results and explanation

| Principal components | Output dimension | Attribute | Representative kansei adjectives | Explanations |
|---|---|---|---|---|
| Principal component 1 | Multi-dimensional | Particularity | Ordinary-chic | Comprehensively determined according to the uniqueness, color, character and complexity of the product |
| Principal component 2 | Multi-dimensional | Fashionality | Traditional-fashionable | Comprehensively determined according to the age and complexity of the product |

TABLE 5-continued

PCA-E-based screening results and explanation

| | | | Content | |
|---|---|---|---|---|
| Principal components | Output dimension | Attribute | Representative kansei adjectives | Explanations |
| Principal component 3 | 1-dimensional | Occasion | Leisure-formal | Determined only according to the applicable occasions of the product |
| Principal component 4 | 1-dimensional | Character | Calm-warm | Determined only according to the personality of the product user |
| Principal component 5 | 1-dimensional | Sex | Female-male | Determined only according to the gender of the product user |
| Principal component 6 | 1-dimensional | Structure | Light-bulky | Determined only according to the structural complexity of the product |
| Principal component 7 | 1-dimensional | Color | Quiet-bright | Determined only according to the color of the product |

The attributes of the kansei adjectives are obtained according to the definition of the kansei adjectives.

The present disclosure obtains the kansei evaluation matrix, extracts the principal components of the kansei adjectives through PCA, and explains the specific meaning of each evaluation dimension based on the principal component load factor to help users evaluate the product. The present disclosure optimizes the screening process of the kansei adjectives, and has potential value for the research and application of kansei engineering and product design.

Those of ordinary skill in the art will understand that the embodiments described herein are intended to help readers understand the principles of the present disclosure, and it should be understood that the protection scope of the present disclosure is not limited to such special statements and embodiments. Those of ordinary skill in the art may make other various specific modifications and combinations according to the technical teachings disclosed in the present disclosure without departing from the essence of the present disclosure, and such modifications and combinations still fall within the protection scope of the present disclosure.

What is claimed is:

1. A method for extracting a kansei adjective of a product based on principal component analysis and explanation (PCA-E), comprising:
S1: constructing a product kansei evaluation vector matrix;
S2: subjecting the product kansei evaluation vector matrix to dimensionality reduction based on principal components:
S21: zero-centering each row in the product kansei evaluation vector matrix;
S22: obtaining a covariance matrix of the product kansei evaluation vector matrix after the zero-centering;
S23: subjecting the covariance matrix obtained in step S22 to orthogonal decomposition to obtain eigenvalues and eigenvectors of the covariance matrix; and
S24: arranging the eigenvalues in a descending order, and extracting the eigenvectors of first f principal components with a cumulative contribution rate greater than a first threshold to form an eigenvector matrix;
S3: obtaining a principal component load factor matrix, and constructing a principal component load factor table; and
S4: extracting kansei adjectives representing the principal components according to a kansei adjective extraction strategy.

2. The method for extracting the kansei adjective of the product based on PCA-E according to claim 1, wherein the product kansei evaluation vector matrix is constructed according to kansei evaluation vectors of different users for a same product or same product category;
the product kansei evaluation vector matrix constructed for an m-th product or product category $C_m$ is as follows:

$$V_m = \begin{bmatrix} x_{m,1}^1 & \cdots & x_{m,1}^k \\ \vdots & \ddots & \vdots \\ x_{m,n}^1 & \cdots & x_{m,n}^k \end{bmatrix} \quad (1)$$

wherein, $x_{m,n}^k$ denotes an evaluation score of a user $P_k$ for an n-th kansei adjective $K_n$ of the product or product category $C_m$; m, n, and k are integers; an evaluation criterion for the product kansei evaluation vector matrix $V_m$ is a 5-, 7- or 9-point Likert scale; $KW_n = (kw_n^-, kw_n^+)$ denotes a pair of antonyms for expressing an attribute of the kansei adjective $K_n$, wherein $kw_n^-$ and $kw_n^+$ denote left and right antonyms, respectively.

3. The method for extracting the kansei adjective of the product based on PCA-E according to claim 2, wherein step S21 further comprises: zero-centering each row in the product kansei evaluation vector matrix $V_m$ by subtracting a mean value of each row from each element in the corresponding row in the product kansei evaluation vector matrix $V_m$ to obtain a product kansei evaluation vector matrix $V'_m$ after zero-centering.

4. The method for extracting the kansei adjective of the product based on PCA-E according to claim 3, wherein step S22 further comprises: obtaining a variance matrix of the product kansei evaluation vector matrix $V'_m$ after zero-centering:

$$C = \frac{1}{n} V'_m V'^T_m \quad (2)$$

wherein, n denotes a total number of kansei adjectives.

5. The method for extracting the kansei adjective of the product based on PCA-E according to claim 4, wherein step S23 further comprises: subjecting the variance matrix C to orthogonal decomposition:

$$C = P\lambda P^T \quad (3)$$

wherein, $\lambda=\text{diag}(\lambda_1, \lambda_2, \ldots, \lambda_n)$, $\lambda_i$ (i=1,2,3, . . . , n), denotes eigenvalues of the variance matrix C, which are arranged in a descending order from $\lambda_7$ to $\lambda_n$; and $P=[P_1, P_2, \ldots, P_n]$, $P_i$ (i=1,2,3, . . . , n), denotes a feature column vector corresponding to $\lambda_i$, and the feature column vector is referred to as an i-th principal component direction.

6. The method for extracting the kansei adjective of the product based on PCA-E according to claim 5, wherein step S24 further comprises: calculating the cumulative contribution rate after projection in the principal component direction:

$$\theta = \left(\sum_{i=1}^{f} \lambda_i\right) / \left(\sum_{i=1}^{n} \lambda_i\right), \text{ and} \quad (4)$$

extracting, according to the set first threshold, the first f eigenvectors to form an eigenvector matrix P', $P'=[P_1, P_2, \ldots, P_f]$, f<n.

7. The method for extracting the kansei adjective of the product based on PCA-E according to claim 6, wherein step S3 is designed to obtain the principal component load factor table, and further comprises:
   S31: obtaining the principal component load factor matrix based on principal component eigenvalues and specific vectors; and
   S32: constructing the principal component load factor table through the principal component load factor matrix.

8. The method for extracting the kansei adjective of the product based on PCA-E according to claim 7, wherein step S31 further comprises: calculating a principal component load factor matrix F:

$$F_{ij} = \sqrt{\lambda_i} p_{ij} \quad (5)$$

wherein, $F_{ij}$ denotes an i-th principal component load factor of a j-th kansei adjective; $p_{ij}$ denotes a j-th element in an eigenvector $P_i$; i=1,2,3, . . . , f; and j=1,2,3, . . . , n.

9. The method for extracting the kansei adjective of the product based on PCA-E according to claim 1, wherein step S4 further comprises: cleaning data in the principal component load factor table, wherein each kansei adjective corresponds to only one principal component load factor; and sequentially extracting, according to the kansei adjective extraction strategy, the kansei adjectives representing the principal components.

10. The method for extracting the kansei adjective of the product based on PCA-E according to claim 2, wherein step S4 further comprises: cleaning data in the principal component load factor table, wherein each kansei adjective corresponds to only one principal component load factor; and sequentially extracting, according to the kansei adjective extraction strategy, the kansei adjectives representing the principal components.

11. The method for extracting the kansei adjective of the product based on PCA-E according to claim 3, wherein step S4 further comprises: cleaning data in the principal component load factor table, wherein each kansei adjective corresponds to only one principal component load factor; and sequentially extracting, according to the kansei adjective extraction strategy, the kansei adjectives representing the principal components.

12. The method for extracting the kansei adjective of the product based on PCA-E according to claim 4, wherein step S4 further comprises: cleaning data in the principal component load factor table, wherein each kansei adjective corresponds to only one principal component load factor; and sequentially extracting, according to the kansei adjective extraction strategy, the kansei adjectives representing the principal components.

13. The method for extracting the kansei adjective of the product based on PCA-E according to claim 5, wherein step S4 further comprises: cleaning data in the principal component load factor table, wherein each kansei adjective corresponds to only one principal component load factor; and sequentially extracting, according to the kansei adjective extraction strategy, the kansei adjectives representing the principal components.

14. The method for extracting the kansei adjective of the product based on PCA-E according to claim 6, wherein step S4 further comprises: cleaning data in the principal component load factor table, wherein each kansei adjective corresponds to only one principal component load factor; and sequentially extracting, according to the kansei adjective extraction strategy, the kansei adjectives representing the principal components.

15. The method for extracting the kansei adjective of the product based on PCA-E according to claim 7, wherein step S4 further comprises: cleaning data in the principal component load factor table, wherein each kansei adjective corresponds to only one principal component load factor; and sequentially extracting, according to the kansei adjective extraction strategy, the kansei adjectives representing the principal components.

16. The method for extracting the kansei adjective of the product based on PCA-E according to claim 8, wherein step S4 further comprises: cleaning data in the principal component load factor table, wherein each kansei adjective corresponds to only one principal component load factor; and sequentially extracting, according to the kansei adjective extraction strategy, the kansei adjectives representing the principal components.

17. The method for extracting the kansei adjective of the product based on PCA-E according to claim 9, wherein the kansei adjective extraction strategy specifically comprises:
   (1) if the corresponding principal component load factor of the kansei adjective is less than 0: exchanging the left and right antonyms of the kansei adjective in position, and screening according to strategies (2) to (4);
   (2) if the principal component corresponds to only one kansei adjective: taking the corresponding kansei adjective as the kansei adjective to represent the principal component;
   (3) if the principal component corresponds to at least two kansei adjectives that are semantically similar: selecting any kansei adjective as the kansei adjective to represent the principal component; and
   (4) if the principal component corresponds to at least two kansei adjectives that are not semantically similar: removing a kansei adjective that is semantically similar to other principal component, and selecting any remaining kansei adjective as the kansei adjective to represent the principal component.

* * * * *